2,906,639

METHOD OF IMPROVING ADHERENCE OF LUMINESCENT SCREENS

Peter Seats, Lake Hiawatha, and Cecil M. Appleberry, Jr., Paterson, N.J., assignors to Thomas Electronics Inc., Passaic, N.J., a corporation of New Jersey No Drawing. Application February 10, 1955
Serial No. 487,468

2 Claims. (Cl. 117—33.5)

This invention relates to improvements in forming adherent screens of luminescent material on solid surfaces and more particularly relates to a method for increasing the adhesion of luminescent screens deposited by conventional processes.

In the manufacture of cathode ray tubes with metal backed screens it is necessary to provide the luminescent screen with a smooth surface before deposition of the metallic coating. The conventional method of providing this smooth surface on the screen involves the following steps:

(1) Forming a screen on the tube face plate by the well known gravitational settling method and drying as shown, for instance, in the following Patents 2,619,472; 2,298,968; 2,678,888; and 2,344,081.

(2) Adding water to the tube to a depth sufficient to cover the screen.

(3) Casting a film on the water by allowing a few drops of nitrocellulose solution to spread over the surface and harden.

(4) Decanting the water from underneath the film by inclining the tube thus laying the film over the screen surface.

(5) Drying the filmed screen.

When the nitrocellulose film dries it contracts and, if the adhesion of the screen particles to the glass face plate is poor, the film pulls the screen off the glass. Such peeling also occurs at later stages in the manufacture of the tube, especially during evacuation and baking processes, where additional stresses are imposed on the screen.

This problem of screen peeling has long been recognized and in order to improve the adhesion of the screen to the glass some manufacturers bake the tubes in between the screen forming and filming steps. While this procedure has reduced the incidence of screen peeling, the baking temperature utilized is generally over 300° C., with an attendant substantial increase in the cost of the finished tubes.

It is accordingly an object of the present invention to provide a low cost method of improving the adherence of phosphor screens without deleteriously affecting other screen characteristics.

It is another object of the invention to provide a method of improving screen adherence which may be utilized in conjunction with conventional screen forming steps.

It is another object of the invention to provide a method of improving screen adherence and minimizing screen peeling which does not require a high temperature baking operation.

According to the present invention, it has been found by taking direct screen adhesion measurements at various stages in the foregoing conventional process, that there is a marked decrease in screen adhesion following the organic filming step. It has further been found that this decrease is due to the water used in the filming step leaching out the alkali metal silicate bonding agent, such as potassium silicate, employed in the screen forming step. The baking operation previously employed between screening and filming renders the alkali metal silicate insoluble and thus prevents its leaching with the attendant loss of screen adherence; this explains the success of the baking step in maintaining screen adhesion and reducing the incidence of screen peeling.

It has now been found that the alkali metal silicate binder may be chemically insolubilized after screen formation through the use of an alkali metal silicate gelling or flocculating agent, such as boric acid, phosphoric acid, acetic acid, ammonium nitrate or barium acetate. Agents which will cause gelling or flocculation of alkali metal silicates are known in the art and fall generally into three main classes: acids, salts of weak bases and stronger acids, and polyvalent metal salts. The mechanism is somewhat different in each case but the result, the insolubilizing of the silicate, is substantially the same.

The agents may be applied to the screen by soaking the screen after completion of the screening step with a small quantity of a solution of the agent in water or in some other volatile solvent and subsequently drying. Alternatively, the agents may be applied by adding a small quanity thereof directly to the water used in the filming step.

A specific example of the process according to this invention is as follows: A screen was formed according to the conventional screen settling process with a sufficient degree of initial dry adhesion. A de-ionized water containing a suitable gelling agent, namely boric acid, at 0.015% w./w. concentration, was added to the tube in sufficient quantity to cover the screen to a depth of approximately three-quarter inches and the filming operation was then carried on in the normal manner.

The use of a strong mineral acid such as hydrochloric acid would have to be attempted with caution in view of the possibility of chemical attack on the phosphor screen and weaker concentrations would have to be used. In the case of the polyvalent metal class of insolubilizing agents, somewhat high concentrations would be necessary to fully react with the soluble alkali metal silicate mixed with the screen. Weak acids and polyvalent metal salts could normally be used in considerable excess without any undesirable effects. In practice weak acids would be preferred.

We are aware of the fact that boric and phosphoric acids and ammonium compounds have been heretofore utilized in the phosphor suspension in the screen settling step and in the pre-treatment of the glass, as is disclosed in the previously mentioned patents. These prior processes, however, constitute the conventional processes previously referred to and produce a screen which may have to be baked prior to the filming step if adequate screen adhesion is to be obtained. It will be noted that Patents 2,298,968, 2,344,081 and 2,619,472 all specifically point out that the screen must be baked above the fusion temperature of the boric acid and, as pointed out heretofore, this step adds considerable cost to the process. It has been found that screens formed according to the process of the present invention possess a superior adhesive strength and are not subject to the same degree of peeling as are these prior art screens.

It will be apparent to those skilled in the art that the method of this invention may be applied to other type cathode ray tubes than the conventional aluminized type and may be applied in other fields where it is desired to prepare a fluorescent coating on a solid surface.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In the process of forming a fluorescent coating of high adhesion on a solid surface the steps comprising forming a coating of a fluorescent material mixed with a water soluble alkali metal silicate on such solid surface and subsequently treating said coating while said silicate is still soluble with a solution of an alkali metal silicate insolubilizing agent selected from the group consisting of acids, strong acid salts of weak bases, and salts of polyvalent metals.

2. In the process of forming a fluorescent coating of high adhesion on a solid surface the steps comprising forming a coating of a fluorescent material mixed with a water soluble alkali metal silicate on such solid surface, subsequently treating said coating while said silicate is still soluble with a solution of an alkali metal silicate insolubilizing agent selected from the group consisting of acids, strong acid salts of weak bases, and salts of polyvalent metals and forming an organic film on said coating.

References Cited in the file of this patent

UNITED STATES PATENTS

| | | |
|---|---|---|
| 2,116,977 | Laise | May 10, 1938 |
| 2,298,968 | Roberts et al. | Oct. 13, 1942 |
| 2,344,081 | Claude | Mar. 14, 1944 |
| 2,619,472 | Schoenfeldt | Nov. 25, 1952 |
| 2,647,841 | Perl et al. | Aug. 4, 1953 |
| 2,678,888 | Evans | May 18, 1954 |
| 2,684,306 | Brewer et al. | July 20, 1954 |

FOREIGN PATENTS

| | | |
|---|---|---|
| 699,660 | Great Britain | Nov. 11, 1953 |
| 709,994 | Great Britain | June 2, 1954 |